US008708177B2

(12) United States Patent
Roberts (10) Patent No.: US 8,708,177 B2
(45) Date of Patent: Apr. 29, 2014

(54) IN-SITU FOAM CORE DIELECTRICALLY-RESISTANT SYSTEMS AND METHOD OF MANUFACTURE

(76) Inventor: Richard W. Roberts, Tecumseh, MI (US)

( * ) Notice: Subject to any disclaimer, the term of this patent is extended or adjusted under 35 U.S.C. 154(b) by 77 days.

(21) Appl. No.: 13/463,708

(22) Filed: May 3, 2012

(65) Prior Publication Data

US 2013/0256024 A1  Oct. 3, 2013

Related U.S. Application Data

(60) Provisional application No. 61/617,046, filed on Mar. 29, 2012.

(51) Int. Cl.
| | |
|---|---|
| B65D 8/00 | (2006.01) |
| B65D 8/18 | (2006.01) |
| B65D 8/04 | (2006.01) |
| B65D 1/40 | (2006.01) |
| H02G 1/02 | (2006.01) |

(52) U.S. Cl.
USPC ....... 220/4.02; 220/4.04; 220/4.05; 220/4.21; 220/62.11; 220/62.22; 174/5 R; 174/5 SG; 174/5 SB; 182/2.4

(58) Field of Classification Search
USPC ......... 220/4.02, 4.04, 4.05, 4.21, 4.24, 62.11, 220/62.15, 62.22, 592.2, 592.25; 174/5 R, 174/5 SG; 428/34.1, 35.7, 35.9, 36.5; 182/2.4, 46
See application file for complete search history.

(56) References Cited

U.S. PATENT DOCUMENTS

| | | | |
|---|---|---|---|
| 1,588,778 A | 6/1926 | Sorensen |
| 3,062,337 A | 11/1962 | Zittle |
| 3,111,787 A | 11/1963 | Chamberlain |
| 3,468,097 A | 9/1969 | Mack |
| 3,598,312 A | 8/1971 | Hamilton |
| 3,745,998 A | 7/1973 | Rose |
| 3,813,040 A | 5/1974 | Heinemeyer |
| 4,651,494 A | 3/1987 | Van Wagoner |

(Continued)

FOREIGN PATENT DOCUMENTS

| | | |
|---|---|---|
| JP | 58213028 | 12/1983 |
| JP | 59155443 | 9/1984 |
| JP | 59210954 | 11/1984 |
| JP | 60090744 | 5/1985 |

OTHER PUBLICATIONS

Website www.jsp.com, 2006, "Arplank, Expanded bead foam packaging materials, Material Properties, Auto/Mil Specs." 21 Pages.

(Continued)

*Primary Examiner* — Anthony Stashick
*Assistant Examiner* — Madison L Poos
(74) *Attorney, Agent, or Firm* — Brooks Kushman P.C.

(57) ABSTRACT

A dielectrically-resistant system includes a first component of a first plastic shell having opposed and spaced apart walls, defining a first cavity. The first plastic shell includes a first rib. Disposed within the first cavity is a first in-situ foam core including expanded polymer beads. The first in-situ foam core has a thermal bond with the first plastic shell. A second plastic shell and in-situ foam core component essentially mirroring the first component is connected to the first component by a connection. The dielectrically-resistant system is capable of resisting an electric potential difference of at least 50 kV.

20 Claims, 9 Drawing Sheets

(56) References Cited

U.S. PATENT DOCUMENTS

| | | |
|---|---|---|
| 4,680,909 A | 7/1987 | Stewart |
| 4,840,973 A | 6/1989 | Kuwabara et al. |
| 5,018,329 A | 5/1991 | Hasan et al. |
| 5,055,350 A | 10/1991 | Neefe |
| 5,366,674 A | 11/1994 | Hattori et al. |
| 5,665,285 A | 9/1997 | Hattori et al. |
| 5,713,518 A | 2/1998 | Fox et al. |
| 5,776,342 A | 7/1998 | Hiranaga |
| 5,866,224 A | 2/1999 | Ang et al. |
| 6,179,215 B1 | 1/2001 | Shea |
| 6,230,981 B1 | 5/2001 | Hill et al. |
| 6,375,892 B2 | 4/2002 | Thomas |
| 6,605,343 B1 | 8/2003 | Motoi et al. |
| 6,931,809 B1 | 8/2005 | Brown et al. |
| 7,219,479 B2 | 5/2007 | Durning et al. |
| 7,358,280 B2 | 4/2008 | Berghmans et al. |
| 7,748,496 B2 * | 7/2010 | Higgins et al. ............ 182/2.4 |
| 7,931,210 B1 | 4/2011 | Pike et al. |
| 7,950,592 B2 | 5/2011 | Yuan |
| 2002/0124531 A1 | 9/2002 | Mossbeck et al. |
| 2003/0224675 A1 | 12/2003 | Yeh |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0030467 A1 | 2/2006 | Mellott |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2010/0028654 A1 | 2/2010 | Takase et al. |
| 2012/0102884 A1 | 5/2012 | Roberts, Jr. |
| 2012/0104110 A1 | 5/2012 | Roberts, Jr. |

OTHER PUBLICATIONS

Website, Manning, www.mmh.com Oct. 2008, Retrived on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

* cited by examiner

IN-SITU FOAM CORE DIELECTRICALLY-RESISTANT SYSTEMS AND METHOD OF MANUFACTURE

CROSS-REFERENCE TO RELATED APPLICATIONS

This application claims the benefit of U.S. provisional Application No. 61/617,046 filed Mar. 29, 2012, the disclosure of which is incorporated in its entirety by reference herein.

TECHNICAL FIELD

The disclosed embodiments relate to dielectrically-resistant system having an in-situ foam core and method of manufacturing of same.

BACKGROUND

Manufacturers of aerial tower equipment attempt to insulate workers engaged with high-voltage electrical transmission lines from electrical arcs attempting to reach ground. At present, dielectrically-resistant fiberglass buckets provide structural strength to a dielectrically-resistant system, but need to be coupled with a sacrificial thermoplastic liner which has better dielectric resistance properties. Having two structures, the fiberglass bucket and the sacrificial thermoplastic liner is expensive.

SUMMARY

In at least one embodiment, a dielectrically-resistant system includes a first component of a first plastic shell having opposed and spaced apart walls, defining a first cavity. The first plastic shell includes a first rib. Disposed within the first cavity is a first in-situ foam core including expanded polymer beads. The first in-situ foam core has a thermal bond with the first plastic shell. A second plastic shell and in-situ foam core component essentially mirroring the first component is connected to the first component by a connection. The dielectrically-resistant system is capable of resisting an electric potential difference of at least 50 kV.

In another embodiment, a dielectrically-resistant system includes a first component of a first plastic shell having opposed and spaced apart walls, defining a first cavity. Disposed within the first cavity is a first in-situ foam core including expanded polymer beads. The first in-situ foam core has a thermal bond with the first plastic shell. A second plastic shell and in-situ foam core component essentially mirroring the first component is connected to the first component by a connection. The dielectrically-resistant system is capable of supporting 3500 lbs.

In yet another embodiment, a dielectrically-resistant system includes a first component of a first shell having opposed and spaced apart walls, defining a first cavity. The first shell has a composition of at least one of a polyolefin polymer, a vinyl resin polymer, or a polystyrene polymer. The first shell has a rib and a step. Disposed within the first cavity is a first in-situ foam core including expanded polymer beads. The expanded polymer beads composition is capable of being recyclable with the first shell composition. A component having a second plastic shell and a second in-situ foam core is connected to the first component by a connection. The dielectrically-resistant system is capable of passing ANSI 92.2 specifications.

Except where expressly indicated, all numerical quantities seen the descriptions in claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

DETAILED DESCRIPTION

Figure 1:
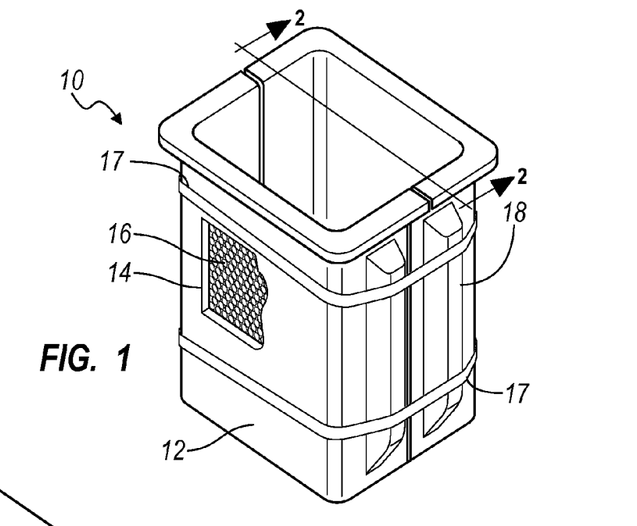
FIG. 1 schematically illustrates in an isometric perspective view a dielectrically-resistant bucket according to at least one embodiment.

FIG. 1 schematically illustrates a dielectrically-resistant bucket 10 having a dielectrically-resistant bucket component 12 including a wall 14 having a thermal bond to an in-situ foam core 16. A plurality of ribs 18 connect dielectrically-resistant bucket 10 to the metal framework (not shown) of an aerial tower. In-situ foam core 16 is formed by expanding pre-expanded beads with steam or superheated steam. In at least one embodiment, the thermal bond includes the cooled connection of a molten or softened portion of wall 14, a molten or softened portion of in-situ foam core 16, and a co-mingled layer including portions of both wall 14 and core 16.

In at least one embodiment, wall 14 thickness may range from 0.02 inches to 0.5 inches. In another embodiment, wall 14 thickness may range from 0.125 inches to 0.25 inches.

In at least one embodiment, in-situ foam core 16 thickness may range from 0.15 inches to 6 inches. In another embodiment, in-situ foam core 16 thickness may range from 0.2 inches to 4 inches. In another embodiment, in-situ foam core 16 thickness may range from 0.5 inches to 1 inch.

In at least one embodiment dielectrically-resistant bucket 10 supports greater than 3500 lbs. In another embodiment, dielectrically-resistant bucket 10 supports greater than 6500 lbs. In yet another embodiment dielectrically-resistant bucket 10 supports greater than 8000 lbs.

Wall 14 in at least one embodiment, is formed of a composition of any moldable composition. Non-limiting examples of the composition include, but not limited to, a liquid silicone rubber, a synthetic rubber, a natural rubber, a liquid crystal polymer, a synthetic polymer resin, and a natural polymer resin. In another embodiment, wall 14 is a formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, wall 14 is formed of a composition of a polyolefin including polypropylene and polyethylene having a viscosity ranging from 1 grams/10 min to 30 grams/10 min.

Dielectrically-resistant bucket component 12, in at least one embodiment, may comprise a plurality of walls 14, such as an inner wall and an outer wall, the plurality of walls being joined at a joint by methods known in the art.

In-situ foam core 16, in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core. In another embodiment, pre-expanded bead is result of the first expansion step where raw bead is expanded from 25% to 90% of the fully-expanded bead size.

A fluid for the second expansion step of the two-step expansion process for beads causes the pre-expanded beads to expand completely to form the fully expanded beads. Examples of the fluid include, but are not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO™ EPP, has no external wall.

In at least one embodiment, dielectrically-resistant bucket 10 weight ranges from 35 to 220 lbs. In another embodiment, dielectrically-resistant bucket 10 weight ranges from 60 lbs. to 180 lbs. In yet another embodiment, dielectrically-resistant bucket 10 weight ranges from 80 lbs. to 160 lbs.

In at least one embodiment, in-situ foam core 16 density, after expansion by steam ranges from 1 lb/ft$^3$ to 25 lbs/ft$^3$. In at least one embodiment, in-situ foam core 16 density ranges from 1.5 lbs/ft$^3$ to 15 lbs/ft$^3$. In at least one embodiment, in-situ foam core 16 density ranges from 2 lbs/ft$^3$ to 9 lbs/ft$^3$. In at least one embodiment, in-situ foam core 16 density ranges from 3 lbs/ft$^3$ to 6 lbs/ft$^3$.

In at least one embodiment, wall 14 with a range of 0.025 inch thickness to 0.1 inch thickness is comprised of a metallocene polypropylene. Such a combination is found to improve adhesion between wall 14 and in-situ foam core from 16 formed of EPP.

In at least one embodiment, dielectrically-resistant bucket 10 passes ANSI A92.2 testing for dielectric resistance at greater than 50 kV when in-situ foam core 16 thickness ranges from 1.2 inches to 2 inches at a density range from 1.5 lbs/ft$^3$ to 5 lbs/ft$^3$.

Dielectrically-resistant bucket 10, in at least one embodiment, passes ANSI A92.2 testing for resistance to arcing at a range of 50 kV to 70 kV when in-situ foam core 16 thickness ranges from 1.2 inches to 2 inches at a density ranges from 1.5 lbs/ft$^3$ to 5 lbs/ft$^3$. The unitized dielectrically-resistant bucket 10 replaces, in many embodiments, the structural fiberglass bucket and the sacrificial plastic liners at a reduced cost. Wall 14, in certain embodiments is made thicker than 0.25" so as to extend the useful life of the dielectrically-resistant bucket 10.

Figure 2:
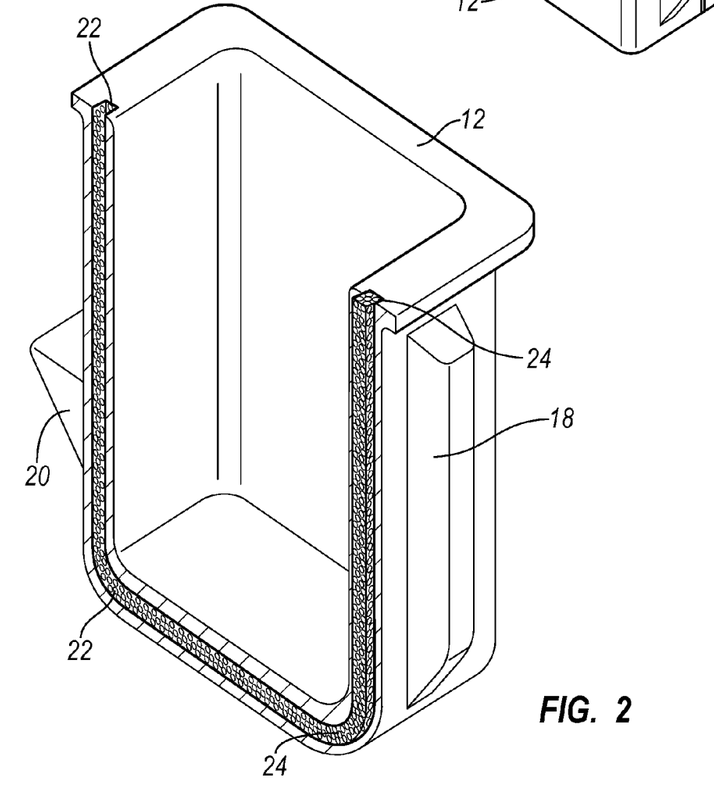
FIG. 2 schematically illustrates in a isometric cross-sectional perspective view along axis 2-2 of FIG. 1 a dielectrically-resistant bucket component according to at least one embodiment.

Turning now to FIG. 2, a dielectrically-resistant bucket component 12 having an integrated rib 18 and a step 20 further includes optional cooperative interlock regions 22 and 24. Dielectrically-resistant bucket component 12 comprises one half of dielectrically resistant bucket 10. Two mirror image units of dielectrically-resistant bucket component 12 may be joined with dielectrically-resistant adhesive and/or other fastening devices known in the art. Optionally, the cooperative interlock regions 22 and 24 may further cooperate with the fastening devices. The cooperative region has a dielectric resistance to an electrical potential exceeding 50 kV.

In at least one embodiment, at least one of cooperative regions 22 and 24 have an embossment in foam core 16 of dielectrically-resistant bucket component 12 that cooperates with at least one cooperative region 22 and 24 having a protrusion in-situ foam core 16.

In at least one embodiment, the cooperative region includes the dielectrically-resistant adhesive comprising, but not limited to, a polyurethane composition, a methmethacrylate composition, a polyester composition, a vinyl ester composition, and an epoxy composition. In at least one embodiment, an inch-thick layer of dielectrically-resistant adhesive resists an electrical potential difference greater than 50 kV.

In another embodiment, an interlocking metal fastener is embedded in wall 14 and/or in-situ foam core 16. The metal fastener interlocks with a mating portion positioned on the mirror image unit, in one embodiment. The metal fastener has dielectrically-resistant material disposed between the metal fastener and the dielectrically-resistant bucket 12 interior.

In another embodiment, one or more metal bands 17 wrap around dielectrically-resistant bucket 10 fastening the mirror image dielectrically-resistant bucket components 12 together.

In yet another embodiment, one or more connections may secure at least one of a pair of ribs 18 and/or steps 20 together. In at least one embodiment, the connector is a fiberglass or an aramid plate fastened with metal fasteners or adhesive. In another embodiment, the connector is a least one of a metal plate and/or a metal compressive force application connector.

Figure 3A:
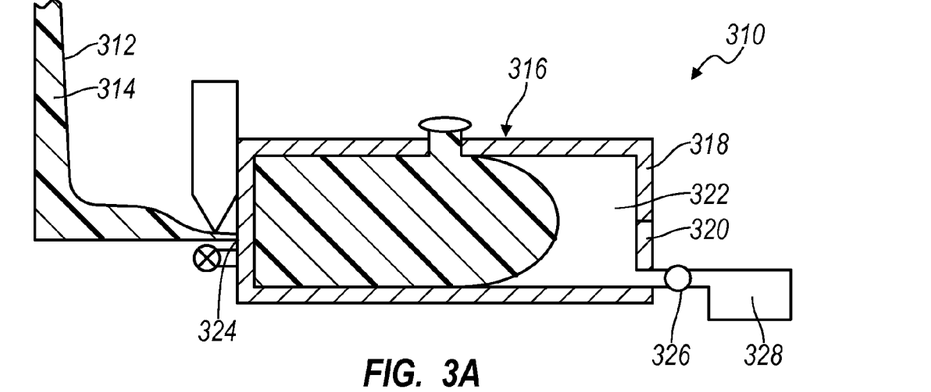
FIGS. 3A-3E schematically illustrates a method of manufacturing a dielectrically-resistant system according to at least one embodiment.

FIGS. 3A-3E schematically illustrate a method of producing a plastic structural article having an in-situ foam core according to at least one embodiment. FIG. 3A has a nozzle 312 containing a molten polymer composition 314. Molten polymer composition 314 is injection molded into a mold 316 having a first mold portion 318 and a second mold portion 320. The first and second mold portions 318 and 320, respectively, define a cavity 322 within the mold 316 into which molten polymer composition 314 is being injected through at least one sprue 324.

Figure 3B:
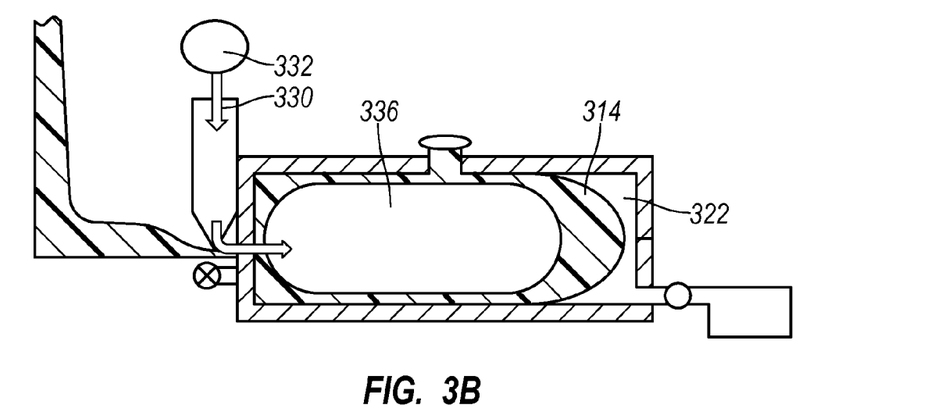

FIG. 3B includes having a fluid 330 from a fluid source 332 enter mold cavity 310 which is now, at least, partially filled with molten polymer 314 by pushing molten polymer 314 towards the walls of mold 316. When molten polymer 314 is pushed completely to the wall of mold 316 by the fluid 330 in FIG. 3C, a cavity 336 is formed inside the injection molding shot of molten polymer 314 and excess molten polymer 314 is displaced into a spillover trap 328 through valves 326 (FIG. 3A). Fluid 330 cools molten polymers 14 sufficiently such that a hollow article 346 is self-supporting. Fluid 330 is removed from cavity 336 through a vent 334. Vent 334 is subsequently closed.

Figure 3C:
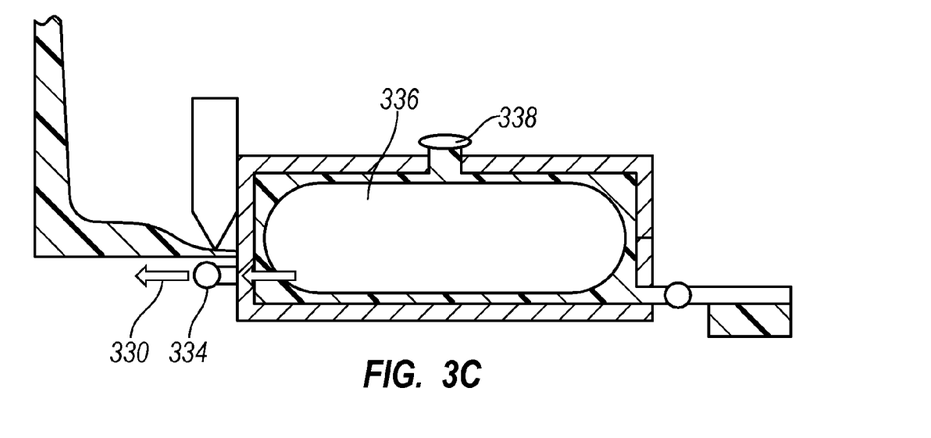

The steps of FIGS. 3A-C are illustrated by U.S. Pat. No. 6,375,892 which is incorporated herein by reference.

Figure 3D:
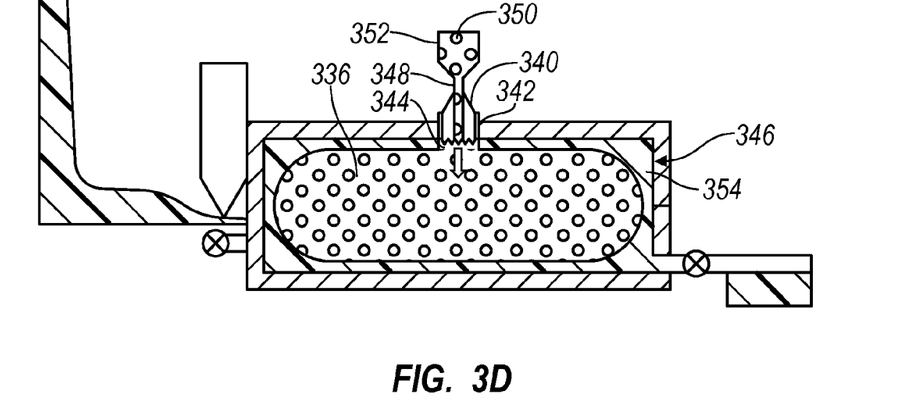

FIG. 3D has a port cap 338 (FIG. 3C) removed and includes a rotary cutter 340 that passes through a mold port 342 cutting an aperture 344 in a wall 354 of the hollow article 346. Rotary cutter 340 withdraws from aperture 344 and a bead dispenser 348 enters aperture 344. Valve 326 is closed.

In FIG. 3D, pre-expanded beads 350 are dispensed from a bead source 352 to bead dispenser 348 and from bead dispenser 348 into cavity 336 of hollow article 346. Bead dispenser 348 withdraws from aperture 344. It is understood that pre-expanded beads 350 may be compressed during dispensing.

Figure 3E:
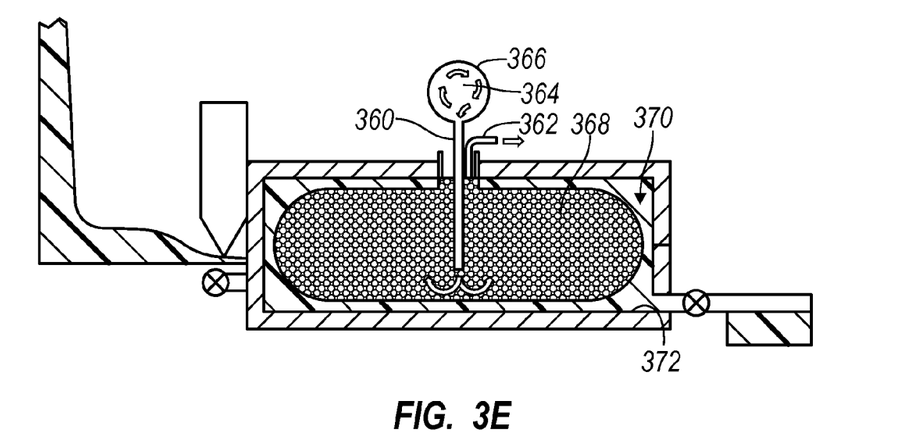

In FIG. 3E, a steam pin 360 and a steam vent 362 are inserted into aperture 344. Steam 364 from steam source 366 is injected into cavity 336 causing rapid expansion of pre-expanded beads 350 which tightly pack cavity 336 forming an in-situ foam core 368 having a thermal bond to wall 354. A plastic structural article 370 having a skin 372 formed of a cooled polymer and in-situ foam core 368 is released from mold 316 by separating the first mold portion 318 from the second mold portion 320.

The steps of FIGS. 3D-E are illustrated by U.S. patent application Ser. Nos. 13/358,181, 13/005,190, and 12/913,132 all of which are incorporated herein by reference.

Figure 4A:
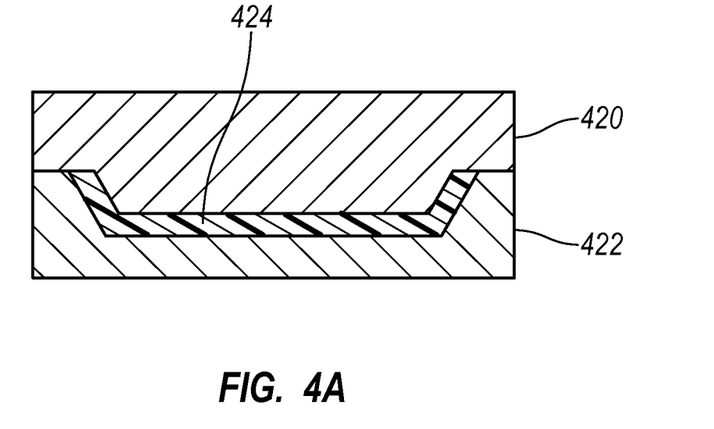
FIGS. 4A-4E schematically illustrates a method of manufacturing a dielectrically-resistant system according to at least another embodiment.

Turning now to FIG. 4A, an injection-molded part 424 is formed between a first mold portion 420 and a second mold portion 422 by any injection-molding method known in the art.

Figure 4B:
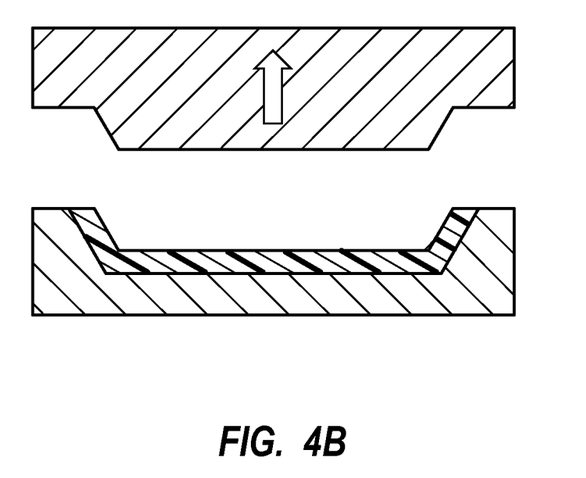
Figure 4C:
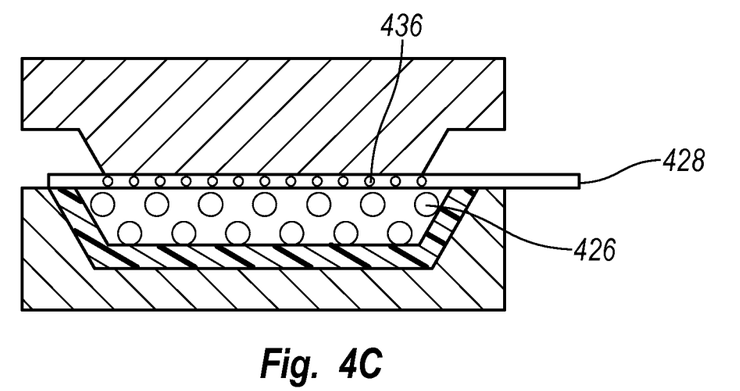

In FIG. 4B, first mold portion 420 is raised to allow insertion of pre-expanded beads 426 and a tube 428, as shown in FIG. 4C. Tube 428 is comprised of a material having a sufficiently high melting point that tube 428 will not melt when exposed to steam or superheated steam. Tube 428 has small apertures capable of permitting steam or superheated steam to infiltrate pre-expanded beads 426.

Figure 4D:
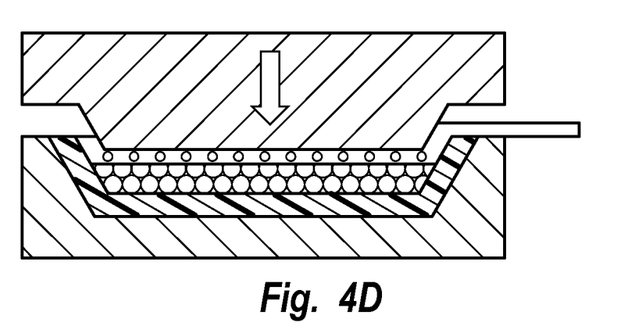
Figure 4E:
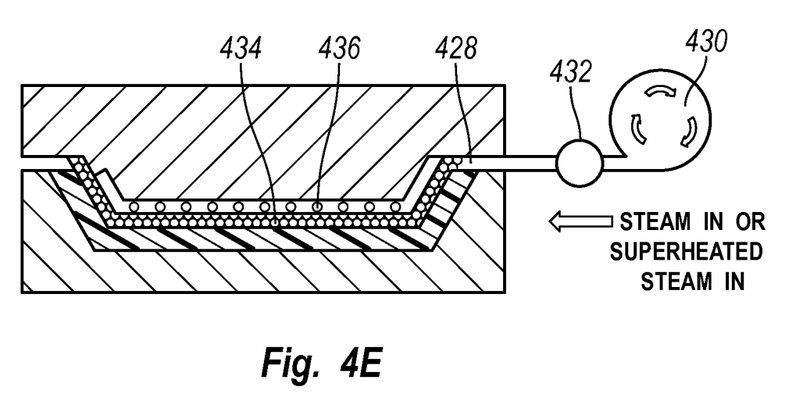

In FIG. 4D, first mold portion 420 is closed, thereby compressing pre-expanded beads 426 and tube 428. In FIG. 4E, steam or superheated steam from steam source 430 passes through valve 432 which is connected to tube 428. Steam interacts with the pre-expanded beads 426, thereby expanding pre-expanded beads 426 to fully expanded beads forming an in-situ foam core 434. In-in situ foam core 434 is thermally bonded to injection-molded part 424. Injection-molded part 424 and in-situ foam core 434 comprise a structural plastic article such as dielectrically resistant bucket component 12, which can be removed from between first mold portion 420 and second mold portion 422 when at least one of the mold portions separates from the other.

The heating mechanism, such as steam, is supplied in FIG. 4E from steam source 430, in at least one embodiment. Steam is directed to a plurality of steam ports 436, such as steam pin 428. When there is a plurality of steam pins 428, spacing between steam pins 428 may vary with the density of unexpanded beads because the steam migration is limited. In at least one embodiment, the spacing between adjacent steam pins 428 ranges from 1 inch to 6 inches. In another embodiment, the spacing between adjacent steam pins 428 ranges from 2 inches to 5 inches. In yet another embodiment, the spacing between adjacent steam pins 428 ranges between the distances defined by equations [1] and [2]

$$D_1 = \frac{1}{ABD \times 0.56} - 0.5 \quad [1]$$

$$D_2 = \frac{1}{ABD \times 5} + 3 \quad [2]$$

wherein $D_1$ is the minimum distance in inches between steam pins 428 and $D_2$ is the maximum distance in inches between steam pins 428, ABD is an average app-arent bulk density of unexpanded and/or partially expanded polymer particles suitable for comprising in-situ foam core 468.

In at least one embodiment, the average apparent bulk density of the pre-expanded beads 426 ranges from 0.15 lbs/ft³ to 4 lbs/ft³. In another embodiment, the average apparent bulk density of the pre-expanded beads 426 ranges from 0.2 lbs/ft³ to 2 lbs/ft³.

In at least one embodiment, steam pin 428 may include a plurality of apertures along the steam pin 428 shaft, thereby distributing steam at a plurality of locations along the shaft. In another embodiment, steam pin 428 may include a plurality of concentric shafts capable of telescoping out in and retracting in, thereby distributing steam at a plurality of locations along the path of the shafts. In yet another embodiment, steam pin 428 includes a plurality concentric shafts, as above, with each shaft section having a plurality of apertures along the shaft section.

Figure 5A:
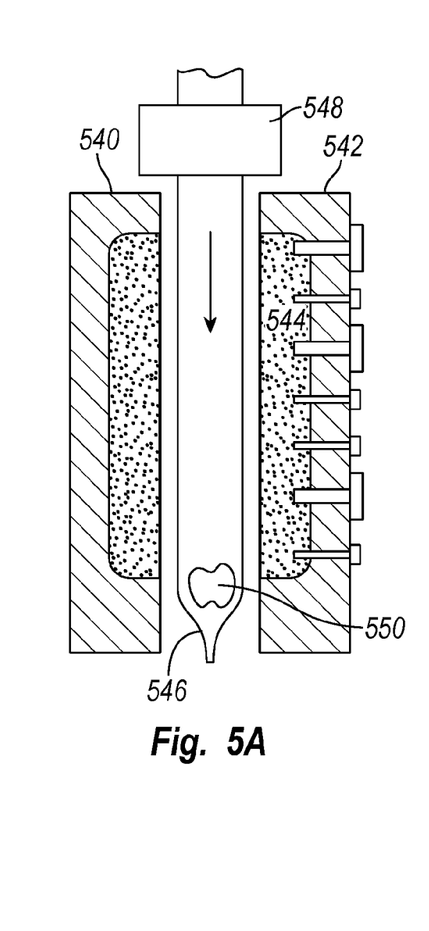
FIGS. 5A-5D schematically illustrates a method of manufacturing a dielectrically-resistant system according to yet another embodiment.
Figure 5B:
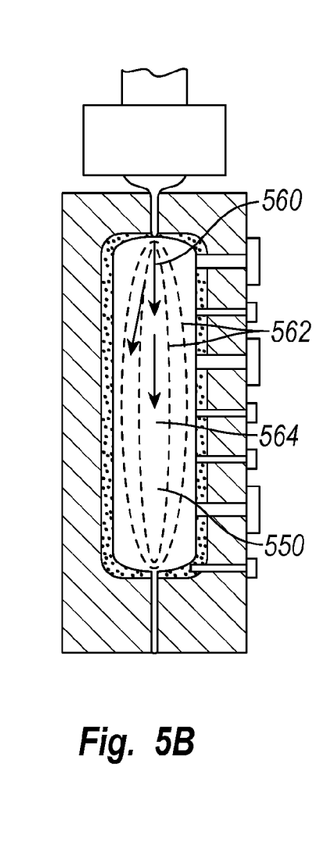

In FIG. 5A, blow mold sections 540 and 542 define a blow mold cavity 544 into which a molten polyolefin parison 546 is extruded from an extruder 548. Parison 546 defines an internal parison cavity 550.

In FIG. 5A, blow mold sections 540 and 542 close upon parison 546. Gas 560 is injected into internal parison cavity 550 inflating the hot parison 546 while still soft and deformable to conform to the walls of the blow mold cavity 544 defining a shell 562 having a cavity 564 which may be larger than the original parison cavity 550.

Figure 5C:
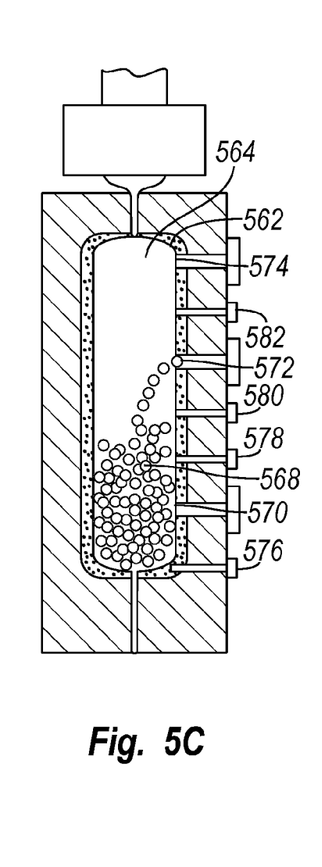

In FIG. 5C, feed apertures 570, 572, and 574 are cut through shell 562. Staged filling begins as unexpanded EPP beads 568 are introduced to cavity 564 through an EPP introduction device fitted to blow mold section 542. At a first stage, EPP beads 568 are introduced through feed aperture 570. When the cavity 564 is substantially filled to the height of feed aperture 570, a second stage introduces unexpanded EPP beads 568 through aperture 572 until that portion of cavity 564 is substantially filled. A third stage introduces unexpanded EPP beads 568 through aperture 574 until the cavity 564 is filled.

EPP introduction device (not shown) is withdrawn from apertures 570, 572, and 574. The apertures 570, 572, and 574 are plugged. Steam injection needles 576, 278, 580, 582 are inserted through blow mold section 542 and shell 562 into the filled cavity 564.

Figure 5D:
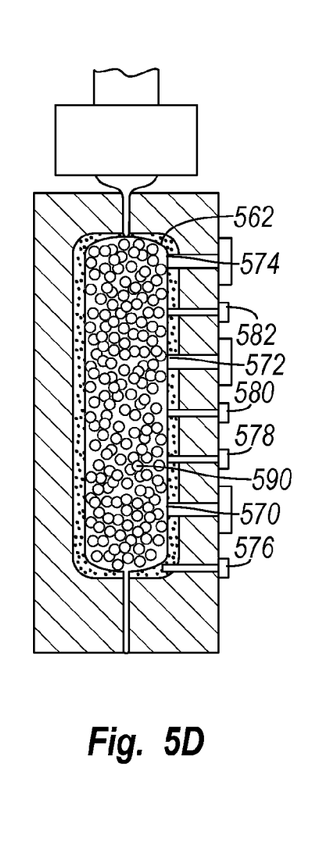

In FIG. 5D, steam is injected through steam injection needles 576, 578, 580, 582 into unexpanded beads 568 causing the beads to expand forming a core 590 in the area that was previously cavity 564, and bonded to the shell 562 with the thermal bond.

It should be understood that other embodiments may use a heating medium other than steam without exceeding the scope of contemplated embodiments. It is further understood that the expanded polyolefin may be formed using a heating medium in cooperation with a blowing agent, such as pentane.

Figure 6:
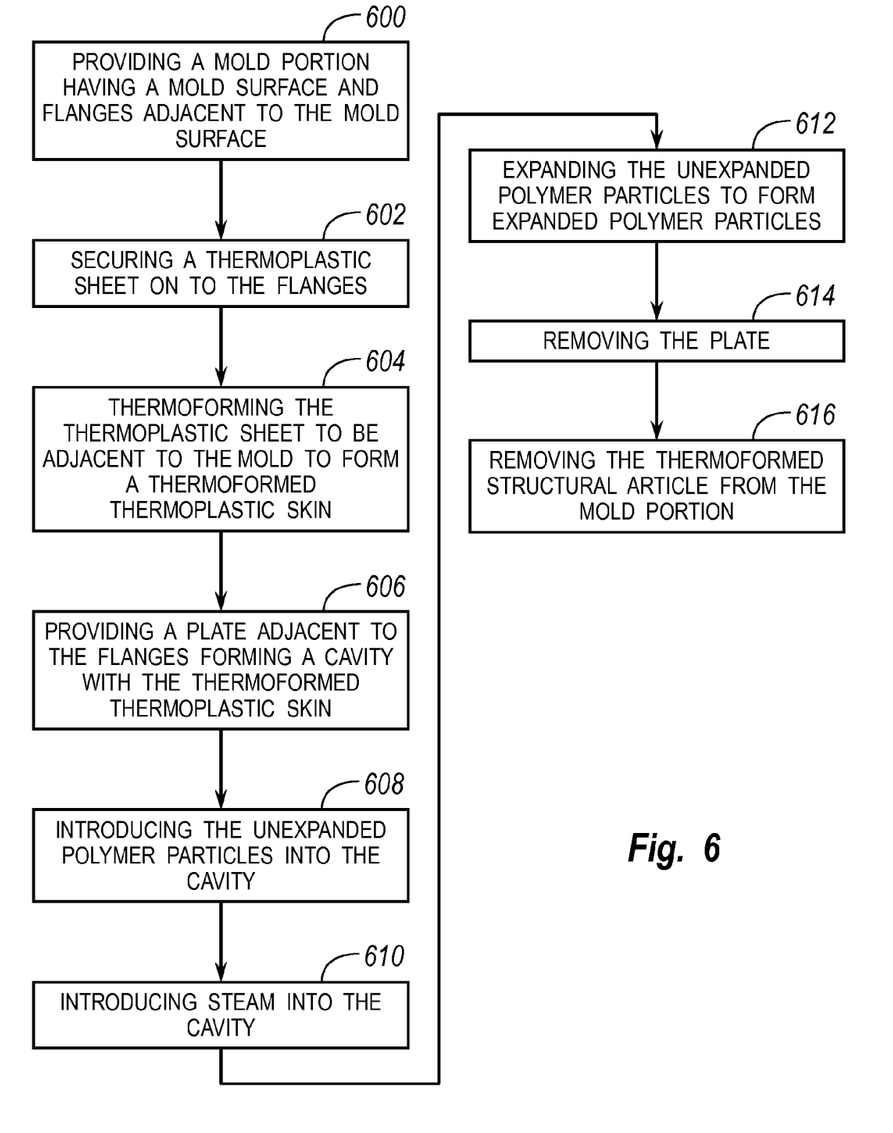
FIG. 6 diagrammatically illustrates a method of manufacturing a dielectrically-resistant system according to yet another embodiment.

At least one embodiment illustrated in FIG. 6, in step 600 a method for manufacture of a dielectrically-resistant bucket component 12 having one plastic layer includes providing a mold portion having a mold surface and flanges adjacent to the mold surface. A plastic sheet having a thermoplastic composition is secured to the flanges in step 602. In step 604 the thermoplastic sheet is thermoformed to be adjacent to the mold surface to form a thermoformed thermoplastic skin. A plate is situated adjacent to the flanges forming a cavity with the thermoformed thermoplastic skin in step 606. In step 608, unexpanded and/or pre-expanded polymer particles are introduced into the cavity when the pressure in the cavity is at least 30 pounds per square inch less than the pressure exerted on the unexpanded and/or pre-expanded polymer particles. During introduction, the unexpanded and/or pre-expanded particles are compressed by more than 10 vol %. The unexpanded and/or pre-expanded particles, in certain embodiments, rebound in size by at least 5 vol. % to approximately their original volume before introduction. In certain embodiments the particles may rebound to exceed their original volume. In step 610, steam is introduced into the cavity causing the unexpanded polymer particles to expand to form expanded polymer particles in step 612. Once the particles have substantially stopped expanding, the plate is removed in step 614. In step 616, the thermoformed structural plastic article is removed from the mold portion. The structural plastic article includes a plastic layer bonded to expanded polymer particles. The bonding occurs during the steps 610 through 612 when the polymer particles are expanding using steam to form an in-situ core with the plastic layer.

Figure 7:
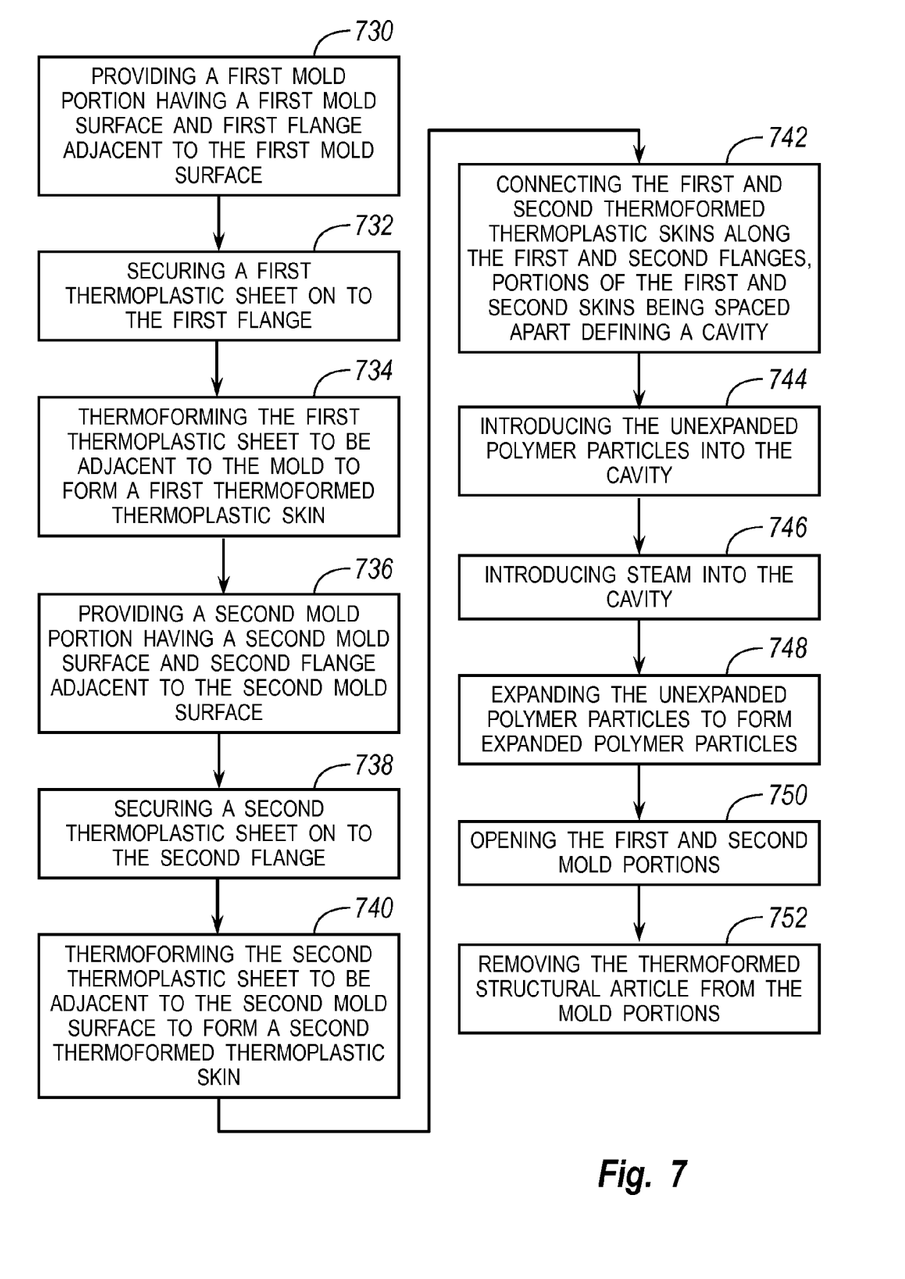
FIG. 7 diagrammatically illustrates a method of manufacturing a dielectrically-resistant system according to yet another embodiment.

Referring now to FIG. 7, a method is recited for forming a dielectrically-resistant bucket component 12 using twin sheet thermoforming skins with the expanding foam core. In step 730 a first mold portion having a first mold surface and first flanges adjacent to first mold surface is provided. In step 732, a first thermoplastic sheet is secured to the first flange. In step 734, the first thermoplastic sheet is thermoformed adjacent to the mold to form the first thermoformed thermoplastic skin.

In step 736, a second mold portion having a second mold surface and second flange adjacent to the second mold surface is provided. In step 738, a second thermoplastic sheet is secured on to the second flange. In step 740, the second thermoplastic sheet is thermoformed to be adjacent to the second mold surface to form a second thermoformed thermoplastic skin.

The first and second thermoformed thermoplastic skins are connected along the first and second flange in step 742, closing the mold. Portions of the first and second skins are spaced apart defining a cavity. In step 744, unexpanded polymer particles are introduced into the cavity. In step 746, steam is introduced into the cavity. The unexpanded polymer particles expand to form expanded polymer particles in step 748. After the polymer particles cease substantially to expand, the first and second mold portions are opened. In step 752, the thermoformed structural plastic article is removed from the mold portions.

It is understood that unexpanded polymer particles may include partially expanded polymer particles. It is also understood that the polymer particles may cease substantially to expand when the pressure in the mold in certain embodiments is 0.5 lbf/in² or less. In other embodiments, the pressure in the mold when the polymer particles may cease to expand substantially, may range from 0.1 lbf/in² to 1 lbf/in².

Figure 8:
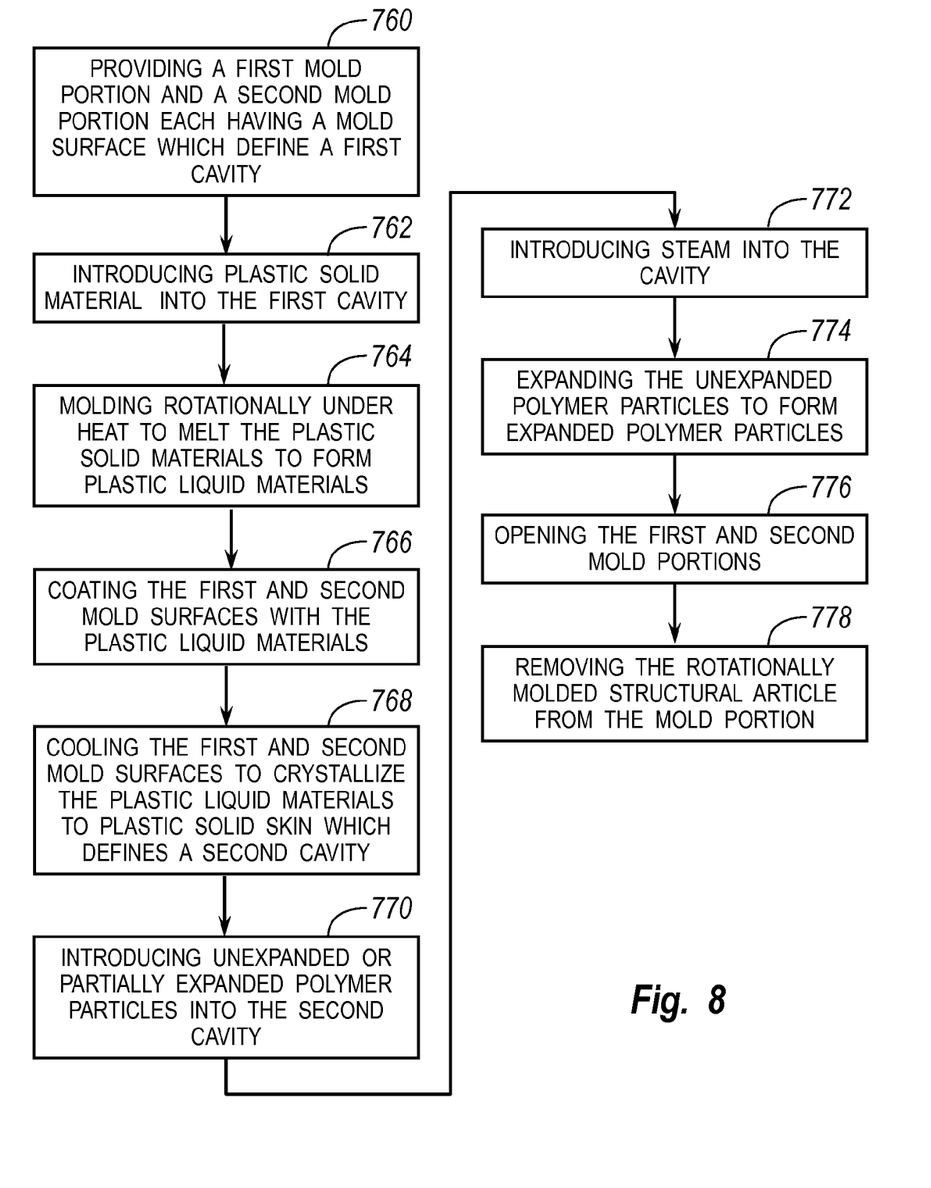
FIG. 8 diagrammatically illustrates a method of manufacturing a dielectrically-resistant system according to yet another embodiment.

In FIG. 8, another embodiment of a method of manufacture of the dielectrically-resistant bucket component 12 is disclosed. In step 760, a first mold portion and a second mold portion each having a mold surface are provided. The two mold surfaces define a first cavity. In step 762, a plastic solid material is introduced into the first cavity. In step 764, the plastic solid material is molded rotationally under heat to melt the plastic solid to form plastic liquid materials. In step 766, the liquid plastic materials coat the first and second mold surfaces. In step 768, the first and second mold surfaces are cooled to crystallize the plastic liquid materials to plastic solid skin which defines a second cavity. In step 770, unexpanded or partially expanded polymer particles are introduced into the second cavity. In step 772, steam is introduced into the second cavity. In step 774, the unexpanded polymer particles are expanded by the steam to form expanded polymer particles. When the expansion of the polymer particles has substantially ceased, the first and second mold portions are opened in step 776. In step 778, the rotationally molded dielectrically-resistant bucket component 12 is removed from the mold portion. It should be understood, that curable plastic materials may be introduced in step 762 as a substitute for the plastic solid materials without exceeding the scope or spirit of the embodiment. It is also understood, that some liquid materials in certain embodiments, will require little or no heat beyond the ambient room temperature to begin curing the plastic liquid materials to crystallize or otherwise solidify the plastic liquid material in step 768. It is also understood that rotationally molding the structural plastic article may use processes such as rotational molding or rotocasting.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dielectrically-resistant system, comprising:
   a first plastic shell having opposed and spaced apart walls and defining a first cavity, the first plastic shell including a first rib;
   a first in-situ foam core including expanded polymer beads disposed in the first cavity, the first in-situ foam core having a thermal bond with the first plastic shell;
   a second plastic shell having opposed and spaced apart walls defining a second cavity, the second plastic shell including a second rib;
   a second in-situ foam core, including expanded polymer beads disposed in the second cavity, the second in-situ foam core having a thermal bond with the second plastic shell; and
   a connection between the first and second plastic shells, wherein the dielectrically-resistant system is capable of resisting an electric potential difference of at least 50 kV.

2. The system of claim 1, wherein the dielectrically-resistant system is capable of resisting an electric potential difference of at least 70 kV.

3. The system of claim 1, wherein the connection includes a dielectrically-resistant adhesive.

4. The system of claim 1, wherein the connection includes a band about the first and second plastic shells.

5. The system of claim 1, wherein the connection includes a connection between the first and second ribs.

6. The system of claim 1, wherein the connection includes an interlocking metal fastener embedded in at least one of the walls of the first plastic shell or the first in-situ foam core and at least one of the walls of the second plastic shell or the second in-situ foam core.

7. The system of claim 1, wherein the first or second in-situ foam core density ranges from 1 lbs/ft$^3$ to 25 lbs/ft$^3$.

8. The system of claim 1, wherein the first or second in-situ foam core density ranges from 3 lbs/ft$^3$ to 6 lbs/ft$^3$.

9. The system of claim 1, wherein the first or second in-situ foam core compositions includes expanded polypropylene (EPE) particles, expanded polypropylene (EPP) particles, or expanded polystyrene particles.

10. The system of claim 1, wherein at least one plastic shell composition includes a polyolefin composition or an alkenyl aromatic polymer composition.

11. The system of claim 1, wherein at least one plastic shell includes a plurality of wall components having at least one joint therebetween.

12. A dielectrically-resistant system, comprising:
    a first plastic shell having opposed and spaced apart walls and defining a first cavity;
    a first in-situ foam core including expanded polymer beads disposed in the first cavity, the first in-situ foam core having a thermal bond with the first plastic shell, the first in-situ foam core having a periphery and an embossment adjacent to the periphery;
    a second plastic shell having opposed and spaced apart walls defining a second cavity;
    a second in-situ foam core, including expanded polymer beads disposed in the second cavity, the second in-situ foam core having a thermal bond with the second plastic shell the second in-situ foam core having a periphery and a protrusion adjacent to the periphery; and
    a connection between the first and second plastic shells, wherein the dielectrically-resistant system is capable of supporting greater than 3500 pounds.

13. The system of claim 12, wherein the dielectrically-resistant system weight ranges between 35 pounds to 220 pounds.

14. The system of claim 12, wherein the thermal bond comprises cooled connection of a first portion of molten or softened portion of at least one wall, a molten or softened portion of at least one in-situ foam core, and a co-mingled layer including a second portion of wall and a second portion of the in-situ foam core.

15. The system of claim 12, where in the first in-situ foam core includes the embossment capable of cooperating with the protrusion of the second in-situ foam core.

16. A dielectrically-resistant system, comprising:
    a first shell having opposed and spaced apart walls and defining a first cavity, the first shell having a composition of at least one of a polyolefin polymer, a vinyl resin polymer, or a polystyrene polymer, the first shell having a rib and a step;
    a first in-situ foam core including expanded polymer beads disposed in the first cavity, the first in-situ foam core having a thermal bond with the first shell, the expanded polymer beads composition capable of being recycled with the first shell composition;
    a second shell having opposed and spaced apart walls defining a second cavity, the second shell having a rib and a step;
    a second in-situ foam core, including expanded polymer beads disposed in the second cavity, the second in-situ foam core having a thermal bond with the second shell; and
    a connection between the first and second shells, wherein the dielectrically-resistant system is capable of passing ANSI 92.2 specifications.

17. The system of claim 16, wherein the connection includes a plate connected to the ribs of the first and second shells.

18. The system of claim 17, wherein the connection includes a fastener connected to the steps of the first and second shells.

19. The system of claim 16, wherein at least one in-situ foam core density ranges from 2 lbs/ft$^3$ to 9 lbs/ft$^3$.

20. The system of claim 16, wherein at least one in-situ foam core water absorption is less than 1 wt. %.

* * * * *